United States Patent [19]

Stillman

[11] Patent Number: 5,158,595
[45] Date of Patent: Oct. 27, 1992

[54] SOIL BIOREMEDIATION ENZYMATIC COMPOSITION

[75] Inventor: Neil W. Stillman, Mesa, Ariz.

[73] Assignee: H₂O Chemists, Inc., Gilbert, Ariz.

[21] Appl. No.: 582,623

[22] Filed: Sep. 14, 1990

[51] Int. Cl.⁵ .......................... C05G 3/04; C02F 1/00
[52] U.S. Cl. ........................................ 71/64.1; 71/6; 71/903; 210/632; 210/606; 252/532; 252/DIG. 12
[58] Field of Search .................. 71/1, 6, 9, 11, 25, 71/26, 7, 8, 27, 64.1, 903; 210/632; 252/532, DIG. 12

[56] References Cited

U.S. PATENT DOCUMENTS

| | | | |
|---|---|---|---|
| 3,404,068 | 10/1968 | Batistoni | 71/1 X |
| 3,640,696 | 2/1972 | Goldmann | 71/9 |
| 4,551,164 | 11/1985 | Tenzer | 71/6 |

*Primary Examiner*—Ferris Lander
*Attorney, Agent, or Firm*—Reinhart, Boerner

[57] ABSTRACT

A soil bioremediation material. A material for improvement of soil conditions includes a mixture of about 85-92% by weight water, about 5-9% by weight molasses from raw sugar, about 2-4% by weight unrefined sugar, about 0.5-1.5% by weight malt, about 0.05-0.2% by weight yeast with the malt to yeast ratio being in the range of 8:1 to 12:1.

2 Claims, No Drawings

SOIL BIOREMEDIATION ENZYMATIC COMPOSITION

The present invention is concerned generally with a product for bioremediation of soil. More particularly, the invention is concerned with an enzymatic product and/or a fermentation product for bioremediation and enhancement of soil condition to support healthy plant growth.

Pollution of the environment, particularly degradation and contamination of water and soil, results in extraordinary damage to the environment and attendant loss of vitality and productivity. Such pollution and general degradation also causes enormous economic losses to fishing, farming and tourist industries. Moreover, with the advent of protective environmental laws and the Super Fund, fines and lawsuits can lead to substantial economic losses to polluters. The occurrence of large scale petroleum pollution is a frequent occurrence, and a number of potential solutions for bioremediation of petroleum pollution have been tried or proposed. For example, current cleanup practices include: 1) physical removal of the polluting petroleum by use of absorption media, 2) dispersal using detergents, 3) burning, 4) microbial degradation under ideal certain conditions, 5) agglomeration of oil on water and sinking to the floor of the water body, and 6) use of organic chemicals, such as kerosene based dispersants, to dissolve and disperse the oil. All of these methodologies are quite expensive to use and have very limited usefulness. Further, even under ideal conditions these methods are often hazardous to carry out and extremely difficult to use to effectively clean up the pollution. In general therefore, bioremediation of soil and water are extremely difficult and expensive tasks.

It is therefore an object of the invention to provide improved products and methods for general bioremediation of soil, including the improvement of soil condition to enhance the ability of soil to support vital plant growth.

Detailed Description of Preferred Embodiments

Compositions prepared in accordance with the invention include: (1) a fermentation composition and (2) a mixture of the fermentation composition combined with another separate enzymatic mixture to form a material for use as a general soil remediation product.

The fermentation composition of category (1) above comprises a mixture of the following preferred ingredients:

| Ingredient* | Wt. Percentage Range |
|---|---|
| water | 88-92 |
| molasses (from raw sugar) | 6-8 |
| unprocessed sugar | 2-3 |
| malt (barley) | 0.5-1.5 |
| yeast (baker's dry) | 0.05-0.2 |
| preferred malt/yeast ratio | 8:1 to 12:1 |

*The listed components are readily available, conventional materials. For example, see the components listed in U.S. Pat. No. 3,404,068 which is incorporated by reference herein.

These ingredients can be mixed together in a container by stirring at a moderate speed. The yeast can be predissolved in warm water and dissolved in the mixture. The malt will likely not dissolve totally and will settle out during the fermentation process, which takes about 5-7 days depending on the temperature of the mixture. The undissolved malt can be filtered out prior to use of the fermentation product, either as a soil bioremediation product or as one of a two component mixture also used for soil bioremediation.

A. ENZYMATIC FERMENTATION PRODUCT

The fermentation batch product described above can be used alone as a natural enzymatic soil conditioner. Soils can degrade and not support adequate plant growth, the soil can become compacted and not allow water or air to the plant roots and nutrients can be tied up with the other soil constituents. The fermentation product can be applied to the soil, and the product can react with the soil and the bound nutrients to release these nutrients and make them available for support of plant growth. Regardless of the precise mechanisms occurring, the fermentation product has been found to be beneficial for bioremediation of soils, particularly for difficult soils such as hard pan and clay based soils (see Example 4).

The fermentation product can be used on grasses, fruit bearing plants and agriculture crops generally and can be used without causing adverse effects on the plants or posing a hazard to humans. All of the ingredients of the fermentation product are biodegradable, and the product can be utilized repeatedly on the same soil without causing any cumulative damage or damage to the environment which is common for other typical soil chemical treatment products and methods.

B. ENZYMATIC SOIL DEGRADATION PRODUCT

The fermentation product described above can also be used in combination with the fermentation product to form an excellent soil remediation product. In a first phase of preparation, the fermentation product is obtained in the manner described above in subsection A and then mixed with a second mixture comprising the following preferred ingredients:

| Ingredient | Wt. Percentage (after combining with fermentation) product) |
|---|---|
| water | 83-88* |
| TERGITOL (a trademark of Union Carbide Corporation) (15-S-9 nonionic ethoxylated secondary alcohol 8-9 moles of ethylene oxide) | <2 |
| SURFONIC (a trademark of Texaco Corporation) L 24-7 (nonionic surfactant ethoxylated linear alcohol 6-7 moles of ethylene oxide) | <2 |
| Sodium Borate (Potassium Borate tetrahydrate) | 2-3 |
| Citric Acid (ascorbic acid) | 0.1-0.5 |
| Lactic Acid | 0.1-1 |
| Tripolyphosphate (Sodium Tri basic phosphate or monobasic or dibasic phosphate) | <2 |
| Monosodium Glutamate or Urea | 1-2 |

*Water can be added all at once or ~33% at the start of mixing of the other components and then add 50-55% more water.

These ingredients should be mixed slowly, particularly when adding the tripolyphosphate or lumps will collect. High speed agitation can cause foaming. Once this second mixture is thoroughly mixed, the fermentation product can be added and mixed to form the final enzymatic product. The density should be about 1.04 g/cc and a pH ~ 7.4–7.6.

The above formulation has some of the components present in an enzymatic composition set forth in U.S. Pat. No. 3,635,797 which is incorporated by reference herein. Although there are some compositional similarities, there are key distinctions which give rise to greatly enhanced effectiveness in biodegradation of oil on water as illustrated in the data of the examples. In particular, excellent improvement is obtained when using the monosodium glutamate. The activity of the instant product is much greater than in the '797 patent, while not requiring the use of any type of catalyst, such as the magnesium salt present in the '797 patent. The two surfactants used in the above described composition are believed to perform two functions. The TERGITOL surfactants act to disperse and break down the soil, while the SURFONIC surfactants act as carriers for biological media which attach and biodegrade the soil and release nutrients bound up in the soil. In the preferred form of the invention, both these types of surfactants, or their equivalent, are present.

EXAMPLES

By way of illustration and without limitation, the following examples illustrate preparation and testing of a number of embodiments of the invention.

EXAMPLE 1

A fermentation product was prepared using the following ingredients:

| Ingredients | Weight (g) |
|---|---|
| water (soft, tap water) | 669 |
| dark molasses (Brer Rabbit) | 56 |
| Tubinado sugar (unrefined) | 16.8 |
| malt (barley) | 7.65 |
| Brewer's Yeast | 0.83 |

The water and dark molasses were stirred to form a uniform solution and then mixed thoroughly with the remaining ingredients. The mixture had a pH of about 5.7, and the mixture was stored at room temperature (75° F.) in a dark cabinet. Fermentation was observed to be occurring the next day, and the solution was a dark brown color. The sample was occassionally stirred, and fermentation was completed ten days later. The finished product had an alcohol content of 44.9 g/l or 5.69% by volume.

EXAMPLE 2

This fermentation product was prepared in the same manner as Example 1, but Fleischmann's "fresh active" Yeast Cake (wet cake) was substituted for Brewer's Yeast. The mixture had an initial pH of 5.65 and 4.3 once fermentation was complete. The alcohol content was 45.5 g/l or 5.77% by volume.

EXAMPLE 3

This fermentation product was prepared in the same manner as Example 1, but Fleischmann's Baker's Yeast Dry pak was substituted for Brewer's Yeast. The mixture had an initial pH of 5.65. The alcohol content was 54.2 g/l or 6.86% by volume. The alcohol yield using the Baker's Yeast was the best of the three examples using different yeasts. Such increased alcohol content provided enhanced wettability of oil by the final enzymatic product (i.e., lowered surface tension for the product). This property allows increased penetration of the active enzymatic product and thus increased reactivity with soil.

EXAMPLE 4

A fermentation product prepared as in Example 3 was used for bioremediation of a typical clay based soil located in Phoenix, Ariz. The solution of fermentation product was applied by a spraying device at the rate of 2–2½ gallons per acre. The fermentation product was particularly applied to low density grass areas of about 80–100 square feet which had been unable to sustain normal grass growth and density, even with the use of conventional lawn fertilization and watering. The grass was a common Bermuda grass, and the fermentation product produced rapid growth of the grass and previously unachievable thickening. The resulting growth after treatment and normal watering resulted in grass growth and density substantially the same as normal areas of grass.

This same fermentation product has also been applied to yard shrubs, citrus trees and flowers with substantial improvement in vitality over previous growth patterns.

EXAMPLE 5

A combination of the fermentation product of Example 3 and an enzymatic composition (such as, one from Examples 6–8) were combined to form a final bioremediation enzymatic composition. Treatment of grass and other plants was carried out in the manner described in Example 4, and the results were at least as good as in Example 4 in terms of plant growth. Much greater improvement resulted for soil aeration due to the use of the surfactants in the enzymatic composition.

EXAMPLE 6

A variety of enzymatic compositions for accelerating biodegradation were made using the following ingredients and conditions; the first group ("Fermentation Portion") is the starting fermentation type product with various types described in Examples 1–3, and the second group ("Emulsifier Portion") is the emulsifier or enzymatic mixture to be combined with the fermentation product to produce a bioremediation enzymatic treatment compositon:

| Fermentation Portion Ingredient | Sample (a) wt. (g) | Sample (b) wt. (g) | Sample (c) wt. (g) |
|---|---|---|---|
| water (hot, soft tap) | 669 | 699 | 669 |
| molasses (Brer Rabbit) | 56 | 56 | 56 |
| Stir and dissolve the molasses in the water | | | |
| Turbinado Sugar | 16.2 | 16.2 | 16.2 |
| Malt (barley) | 7.65 | 7.65 | 7.65 |
| Baker's Yeast (wet cake) | 0.83 | — | — |
| Baker's Yeast (dry) | — | — | 0.83 |
| Brewer's Yeast | — | 0.83 | — |

These mixtures were fermented for 5 days at room temperature with the resulting final pH values: (a) 4.1, (b) 5.6 and (c) 4.3.

| Emulsified Portion Ingredient | Sample (a) wt. (g) | Sample (b) wt. (g) | Sample (c) wt. (g) |
|---|---|---|---|
| water (soft, tap) | 668 | — | |

-continued

| Emulsified Portion Ingredient | Sample (a) wt. (g) | (b) wt. (g) | (c) wt. (g) |
|---|---|---|---|
| SURFONIC 24-7 (Texaco, Inc.) | 40.5 | 60.0 | — |
| SURFONIC 24-9 (Texaco, Inc.) | — | 54.0 | 40.5 |
| TERGITOL 15-S-7 (Union Carbide) | 36.2 | — | — |
| TERGITOL 15-S-9 (Union Carbide) | — | — | 36.2 |
| Sodium Borate | 51.8 | 77.0 | 51.8 |
| Citric Acid | 43.5 | 5.2 | 67.5 |
| Lactic Acid | 19.0 | 28.0 | 19.0 |
| Urea | 126 | 126 | 126 |
| water (after mixing all above) | 1147 | 1147 | 1147 |
| Total Weight | 2882 g | 2860 g | 2906 g |

Example 7

A subsequent specimen like Example 6 (c) was prepared but with the substitution of monosodium glutamate for urea. This specimen was also evaluated for performance of bioremediation of soil and excellent results were obtained Example 8

A fermentation product was prepared using the following ingredients:

| Ingredients | Weight (lb.) | Weight (%) |
|---|---|---|
| water (deionized) | 11,161 | 89.26 |
| molasses (dark) | 935 | 7.47 |
| turbinado sugar (unrefined) | 280 | 2.24 |
| malt (barley) | 128 | 1.02 |
| yeast (baker's dry) | 14 | 0.11 |

The ingredients are mixed at a moderate speed, and the yeast can be predissolved in warm water and then added to the mixture. The fermentation process should be completed by 5-7 days depending on the ambient temperature. The product was prepared using deionized water which does not contain minerals that would retard fermentation and consequently reduce the desired, high alcohol levels and enzyme quality. Conventional softened water can also be used if unwanted minerals are not present.

The above described fermentation product can be used independently as a soil bioremediation product or as part of a two component enyzmatic composition for soil bioremediation:

| Ingredients | Weight (lb.) | Weight % (before combination w/ fermentation product) |
|---|---|---|
| water (deionized) | 3011 | 31.32 |
| TERGITOL 15-5-9 (or equivalent) | 183 | 1.9 |
| SURFONIC L-24-7 (or equivalent) | 163 | 1.7 |
| sodium borate (borox decahydrate 30/100) | 234 | 2.43 |
| citric acid | 16 | 0.17 |
| lactic acid (80%) (1.198 sp. gn) | 86 | 0.89 |
| tripolyphosphate | 182 | 1.89 |
| monosodium glutamate | 570 | 5.93 |
| water (deionized) | 5172 | 53.8 |

These ingredients should be mixed slowly with the water which can be added all at one time or in two parts: one can add 31% at the beginning and 53.2% after mixing in all the other ingredients. The final mixture of the fermentation product and the emulsifier portion will have a specific gravity of 1.038 and a pH of about 7.4-7.6. This product using monosodium glutamate (MSG) is preferred over the use of urea. Performance increases substantially when about 2-3% of MSG is present in the final combined mixture.

EXAMPLE 9

A test of the bioremediation performance of an enzymatic composition of the invention (see, for example, Examples 6-8) for petroleum hydrocarbon in soil was performed by the Northern Testing Laboratories, Inc., Fairbanks, Ala. A pretreatment EPA 418.1 determination was done in duplicate, using approximately 15 grams of soil per sample. Pretreatment levels were found to be 737 and 603 mg/dry kg.

The measurement for the soils were conducted by volume since the treatment instructions are based on soil volume. Five hundred milliliters of soil were divided into two portions of 250 ml each, for treatment and control. Each portion was spread evenly in the bottom of a clean, freon-rinsed 2000-ml beaker, forming a layer approximately two centimeters deep. Seven milliliters of product were diluted to 700 ml with deionized water.

The treatment consisted of three applications (approximately 233 ml each) of diluted product at approximately 48-hour intervals. The liquid was simply poured over the top of the soil layer. At the time of each application, the control portion received 233 ml of deionized water. Between treatments, the beakers were covered tightly with aluminum foil and held at approximately 62 degrees Fahrenheit.

Treatment 1: Friday March 9 at 5:00 p.m.
2: Sunday March 11 at 2:00 p.m.
3: Tuesday March 13 at 4:45 p.m.

The treatment ended Thursday March 15 at 7:00 p.m. when the treated and control soils were drained. On Friday March 16, samples of approximately 15 grams were taken from each portion and analyzed for TPH, yielding the following results:

Control sample: 767 mg/dry kg
Treated sample: 391 mg/dry kg

Listed below are quality control assurance reference samples with a known concentration prior to analysis. The acceptable limits represent a 95% confidence interval established by the Environmental Protection Agency or by our laboratory through repetitive analyses of the reference sample. The reference samples indicated below were analyzed at the same time as your sample, ensuring the accuracy of your results.

A quality control test was also performed to insure accuracy of the aforementioned test.

| Sample # | Parameter | Unit | Result | Acceptable Limit |
|---|---|---|---|---|
| EPA 379-1 | Oil & Grease | mg/l | 19.1 | 16.6-23.4 |

EXAMPLE 10

Detailed tests were also performed on the effect of the inventive enzymatic composition on mysid organisms using the procedures recommended by the U.S. Environmental Protection Agency. The test was conducted at a temperatures of 20° to 26° C. with five concentrations of test composition and a dilution water control. The five concentrations used were: 0 mg/L, 1 mg/L, 10 mg/L, 100 mg/L, 1,000 mg/L and 10,000 mg/L. The test results are shown in the table below:

| Nominal Concentration (mg/L) | | Number Alive | | | | | Number Affected | | | | |
|---|---|---|---|---|---|---|---|---|---|---|---|
| | | 0 hr | 24 hr | 48 hr | 72 hr | 96 hr | 0 hr | 24 hr | 48 hr | 72 hr | 96 hr |
| 0 (control) | 1 | 10 | 10 | 10 | 10 | 10 | 0 | 0 | 0 | 0 | 0 |
| 1 | 1 | 10 | 10 | 9 | 9 | 9 | 0 | 0 | 0 | 0 | 0 |
| 10 | 1 | 10 | 10 | 9 | 9 | 9 | 0 | 0 | 0 | 0 | 0 |
| 100 | 1 | 10 | 10 | 10 | 9 | 9 | 0 | 0 | 0 | 0 | 0 |
| 1,000 | 1 | 10 | 9 | 9 | 8 | 8 | 0 | 0 | 0 | 0 | 0 |
| 10,000 | 1 | 10 | 0 | 0 | 0 | 0 | 0 | — | — | — | — |

While preferred embodiments of the invention have been shown and described, it will be clear to those skilled in the art that various changes and modifications can be made without departing from the invention in its broader aspects as set forth in the claims provided hereinafter.

I claim:

1. A material for bioremediation of soil, consisting of a mixture of about 85-92% by weight water, about 5-9% by weight molasses from raw sugar, about 2-4% by weight unrefined sugar, about 0.5-1.5% by weight malt, about 0.05-0.2% by weight yeast with the malt to yeast ratio being in the range of 8:1 to 12:1.

2. The material as defined in claim 1 further including a surfactant containing emulsifier portion, said surfactant selected from the group consisting of nonionic ethoxylated secondary alcohol having about 6-9 moles of ethylene oxide and a nonionic surfactant ethoxylated linear alcohol having about 6-9 moles of ethylene oxide.

* * * * *